United States Patent
Zhong (10) Patent No.: US 10,531,290 B2
(45) Date of Patent: Jan. 7, 2020

(54) MIC VERIFICATION METHOD IN D2D COMMUNICATIONS AND D2D COMMUNICATIONS SYSTEM

(71) Applicants: Yulong Computer Telecommunication Scientific (Shenzhen) Co., Ltd., Shenzhen, Guangdong (CN); Xi'an Coolpad Software Scientific Co., Ltd., Xi'an, Shaanxi (CN)

(72) Inventor: Yantao Zhong, Shaanxi (CN)

(73) Assignee: Nanchang Coolpad Intelligent Technology Company Limited, Nanchang (CN)

( * ) Notice: Subject to any disclaimer, the term of this patent is extended or adjusted under 35 U.S.C. 154(b) by 289 days.

(21) Appl. No.: 15/440,063

(22) Filed: Feb. 23, 2017

(65) Prior Publication Data

US 2017/0164189 A1  Jun. 8, 2017

Related U.S. Application Data

(63) Continuation of application No. PCT/CN2014/090125, filed on Oct. 31, 2014.

(51) Int. Cl.
*H04L 29/06* (2006.01)
*H04W 12/04* (2009.01)
(Continued)

(52) U.S. Cl.
CPC .......... *H04W 12/04* (2013.01); *H04L 9/3247* (2013.01); *H04L 63/0435* (2013.01);
(Continued)

(58) Field of Classification Search
CPC .................................................. H04W 12/04
See application file for complete search history.

(56) References Cited

U.S. PATENT DOCUMENTS

2004/0141611 A1* 7/2004 Szrek ................ G06F 7/58
380/28
2015/0271675 A1* 9/2015 Cheng ............... H04W 8/005
455/410

(Continued)

FOREIGN PATENT DOCUMENTS

| CN | 102123157 A | 7/2011 |
| CN | 103581173 A | 2/2014 |
| WO | WO2014165747 A | 10/2014 |

OTHER PUBLICATIONS

ETSI 3rd Generation Partnership Project, Technical Specification Universal Mobile Telecommunications System; LTE; Proximity-based Services; Security aspects, 3GPP TS 33.303 version 12.1.0 Release 12, Oct. 2014.

(Continued)

*Primary Examiner* — Taghi T Arani
*Assistant Examiner* — Lin Chang
(74) *Attorney, Agent, or Firm* — Young Basile Hanlon & MacFarlane, P.C.

(57) ABSTRACT

An MIC verification method in D2D communications and a D2D communications system include: a monitoring UE receives a discovery announcement message from an announcing UE, in which the discovery announcement message carries a 32-bit MIC, and the MIC is a signature value obtained when the announcing UE conducts, by using a private key, a digital signature on a current time and a time window in the discovery announcement message; and the monitoring UE verifies the correctness of the MIC by using a public key of the announcing UE to determine whether the discovery process is successful.

10 Claims, 10 Drawing Sheets

(51) Int. Cl.
*H04W 76/14* (2018.01)
*H04W 12/10* (2009.01)
*H04L 9/32* (2006.01)
*H04W 8/00* (2009.01)
*H04W 48/10* (2009.01)
*H04W 12/00* (2009.01)
*H04W 92/18* (2009.01)

(52) U.S. Cl.
CPC ........ *H04L 63/0442* (2013.01); *H04L 63/061* (2013.01); *H04L 63/123* (2013.01); *H04W 8/005* (2013.01); *H04W 12/10* (2013.01); *H04W 48/10* (2013.01); *H04W 76/14* (2018.02); *H04W 12/00502* (2019.01); *H04W 92/18* (2013.01)

(56) References Cited

U.S. PATENT DOCUMENTS

| | | | | |
|---|---|---|---|---|
| 2015/0339718 | A1* | 11/2015 | Walton | G06Q 30/0261 705/14.16 |
| 2016/0065362 | A1* | 3/2016 | Choyi | H04L 63/065 380/279 |

OTHER PUBLICATIONS

"3rd Generation Partnership Project; Technical Specification Group Services and System Aspects; Study on Security Issues to support Proximity Services (ProSe) (Release 13)", 3GPP Standard; 3GPP TR 33.833, 3rd Generation Partnership Project (3GPP), Mobile Competence Centre; 650, Route Des Lucioles; F-06921 Sophia-Antipolis Cedex; France, vol. SA WG3, No. V1.1.0, Oct. 7, 2014 (Oct. 7, 2014) pp. 1-125, XP050926754, [retrieved on Oct. 7, 2014], pp. 51, 52, 80.

Samsung: "Security Aspects of ProSe Direct Discovery", 3GPP Draft; S3-131041-Prose-Replayattack, 3rd Generation Partnership Project (3GPP), Mobile Competence Centre; 650, Route Des Lucioles; F-06921 Sophia-Antipolis Cedex; France, vol. SA WG3, No. San Francisco; 20131111-20131115, Nov. 12, 2013 (Nov. 12, 2013), XP050745065, Retrieved from the Internet: URL:http://www.3gpp.org/ftp/Meetings_3GPP_SYNC/RANS/SA/SA3/Docs/ [retrieved on Nov. 12, 2013]; the whole document.

"3rd Generation Partnership Project; Technical Specification Group Services and System Aspects; Proximity-based Services (ProSe); Security aspects (Release 12)", 3GPP Standard; 3GPP TS 33.303, 3rd Generation Partnership Project (3GPP), Mobile Competence Centre; 650, Route Des Lucioles; F-06921 Sophia-Antipolis Cedex; France, vol. SA WG3, No. V12.1.0, Sep. 26, 2014 (Sep. 26, 2014), pp. 1-48, XP050926105, [retrieved on Sep. 26, 2014], p. 11, line 1—p. 13, line 30 and p. 33.

Extended European Search Report dated Feb. 13, 2018 from corresponding EP Application No. 14905207.8.

* cited by examiner

MIC VERIFICATION METHOD IN D2D COMMUNICATIONS AND D2D COMMUNICATIONS SYSTEM

CROSS-REFERENCE TO RELATED APPLICATION(S)

This application is a continuation of international Patent Application PCT No. PCT/CN2014/090125, filed on Oct. 31, 2014, the content of which is hereby incorporated by reference in its entirety.

TECHNICAL FIELD

The present disclosure relates to the field of mobile communications, specifically to an MIC verification method in D2D communications and a D2D communications system.

BACKGROUND

Device-to-Device (abbreviated as D2D) communications are a novel technology for allowing terminals to directly communicate with each other by multiplexing cell resources under the control of a cellular system. The D2D communications may increase the spectrum efficiency the cellular communication system, reduce the transmitting power of the terminal, and, to a certain extent, solve the problem of deficiency in spectrum resources of the wireless communication system. In the 3GPP document, D2D communications are referred as "Proximity Services", and abbreviated as ProSe.

SUMMARY

The present disclosure provides an MIC verification method in D2D communications and a D2D communications system, so as to at least solve the problems in D2D communications that only an announcing UE can verify the correctness of an MIC, a great number of system resources are occupied and there are vulnerabilities incurring DoS attacks.

According to the first aspect, the present disclosure provides an MIC verification method in D2D communications, comprising: receiving, by a monitoring UE, a discovery announcement message from an announcing UE, wherein the discovery announcement message carries a 32-bit MIC which is a signature value obtained when the announcing UE conducts, by using a private key, a digital signature on a current time and a time window in the discovery announcement message; and verifying, by the monitoring UE, the correctness of the MIC by using a public key of the announcing UE, so as to determine whether the discovery process is successful.

Furthermore, before the monitoring UE receives the discovery announcement message from the announcing UE, the method comprises: generating, by a ProSe function entity in a HPLMN corresponding to the announcing UE, the public key and the private key of the announcing UE for signature, when the ProSe function entity in the HPLMN corresponding to the announcing UE receives a first discovery request message from the announcing UE; informing, by the ProSe function entity in the HPLMN corresponding to the announcing UE, the ProSe function entity in VPLMN that the announcing UE will perform a discovery announcement in the VPLMN, and transmitting the public key of the announcing UE to the ProSe function entity in the VPLMN, such that the ProSe function entity in the VPLMN saves the public key; and replying, by the ProSe function entity in the HPLMN corresponding to the announcing UE, a first discovery response message carrying the private key, the current time, and the time window to the announcing UE, such that the announcing UE calculates the MIC on the basis of the private key, the current time, and the time window.

Furthermore, after transmitting the public key of the announcing UE to the ProSe function entity in the VPLMN, such that the ProSe function entity in the VPLMN saves the public key, the method comprises: informing, by a ProSe function entity in a HPLMN corresponding to the monitoring UE, the ProSe function entity in the VPLMN that the monitoring UE will monitor in the VPLMN, when the ProSe function entity in the HPLMN corresponding to the monitoring UE receives a second discovery request message from the monitoring UE; receiving, by the ProSe function entity in the HPLMN corresponding to the monitoring UE, the public key of the announcing UE transmitted by the ProSe function entity in the VPLMN; and replying, by the ProSe function entity in the HPLMN corresponding to the monitoring UE, a second discovery response message carrying the public key to the monitoring UE, such that the monitoring UE saves the public key.

According to the second aspect, the present disclosure further provides an announcing UE comprising: a first transmitting module for transmitting a first discovery request message to a ProSe function entity in HPLMN corresponding to the announcing UE; an announcement receiving module for receiving a first discovery response message replied by the ProSe function entity in the HPLMN corresponding to the announcing UE, wherein the first discovery response message carries a private key, a current time, and a time window; and an announcement calculating module for calculating an MIC on the basis of the private key, the current time, and the time window.

According to the third aspect, the present disclosure further provides a ProSe function entity in a HPLMN interacting with the above-mentioned announcing UE, and comprising: an announcement generating module for generating a public key and a private key of the announcing UE for signature, when receiving a first discovery request message from the announcing UE; an announcement informing module for informing a ProSe function entity in VPLMN that the announcing UE will perform a discovery announcement in the VPLMN; and a second transmitting module for transmitting the public key of the announcing UE to the ProSe function entity in the HPLMN, such that the ProSe function entity in the VPLMN saves the public key, and replying a first discovery response message carrying the private key, a current time, and a time window to the announcing UE, such that the announcing UE calculates an MIC on the basis of the private key, the current time, and the time window.

According to the fourth aspect, the present disclosure further provides a monitoring UE comprising: a first receiving module for receiving a discovery announcement message from an announcing UE, wherein the discovery announcement message carries a 32-bit MIC which is a signature value obtained when the announcing UE conducts, by using a private key, a digital signature on a current time and a time window in the discovery announcement message; and a monitoring verifying module for verifying the correctness of the MIC by using a public key of the announcing UE, so as to determine whether the discovery process is successful.

According to the fifth aspect, the present disclosure further provides a ProSe function entity in a HPLMN interacting with the above-mentioned monitoring UE, and comprising: a monitoring informing module for informing a ProSe function entity in VPLMN that the monitoring UE will monitor in the VPLMN, when receiving a second discovery request message from the monitoring UE; a second receiving module for receiving a public key of an announcing UE transmitted by the ProSe function entity in the VPLMN; and a monitoring transmitting module for replying a second discovery response message carrying the public key to the monitoring UE, such that the monitoring UE saves the public key.

According to the sixth aspect, the present disclosure further provides a ProSe function entity in a VPLMN interacting with the above-mentioned two ProSe function entities in the HPLMNs, and comprising: a VPLMN receiving module for receiving a public key of an announcing UE transmitted by a ProSe function entity in a HPLMN corresponding to the announcing UE, before the announcing UE performs a discovery announcement in the VPLMN; a VPLMN saving module for saving the public key of the announcing UE; and a VPLMN transmitting module for transmitting the public key of the announcing UE to the ProSe function entity in the HPLMN corresponding to a monitoring UE, before the monitoring UE monitors in the VPLMN.

According to the seventh aspect, the present disclosure further provides a D2D communications system comprising: the above-mentioned announcing UE, the above-mentioned ProSe function entity in the HPLMN, the above-mentioned monitoring UE, the above-mentioned ProSe function entity in the HPLMN, and the above-mentioned ProSe function entity in the VPLMN.

In the present disclosure, the public key and the private key of the announcing UE are used; the announcing UE calculates the MIC by means of the private key; the monitoring UE verifies the correctness of the MIC by means of the public key of the announcing UE, and shares functions of the announcing UE; resources are rationally used; and accordingly, the problems in D2D communications are solved that only the announcing UE can verify the correctness of the MIC, a great quantity of system resources are occupied and there are vulnerabilities incurring DoS attacks.

BRIEF DESCRIPTION OF THE DRAWINGS

From the following detailed description of preferred implementations, a variety of other advantages and benefits will become apparent to persons skilled in the art. The drawings are merely for the purpose of illustrating the preferred implementations, and are not intended to limit the present disclosure. Throughout the drawings, similar characters represent similar parts, wherein.

DETAILED DESCRIPTION

Exemplary implementations of the present disclosure are described in more detail with reference to the accompanying drawings. Although the exemplary implementations of the present disclosure are shown in the drawings, it should be appreciated that the present disclosure may be implemented in various ways and is not intended to be limited by the implementations set forth herein. In contrast, these implementations are for a better understanding of the present disclosure, and may teach persons skilled in the art the scope of the present disclosure in its entirety.

The 3GPP TS 23.303 document describes D2D communications and defines functions thereof. The security of D2D communications is partially described in the 3GPP TS 33.303 document. According to the definition in the above document, the D2D discovery process is a necessary phase for establishing connection between multiple User Equipment (abbreviated as UE) involved in D2D communications. The process is for, before D2D communications, detecting and identifying other nearby UEs using Evolved Universal Terrestrial Radio Access (abbreviated as E-UTRA) direct wireless signal.

In the D2D discovery process, a UE referred to as "announcing UE" broadcasts information to the surroundings, informs the surrounding UEs that it owns certain specific information available for other nearby UEs. Multiple "monitoring UEs" monitor surrounding announcement information, and establish a D2D connection after finding the announcement information of interest.

Figure 2:
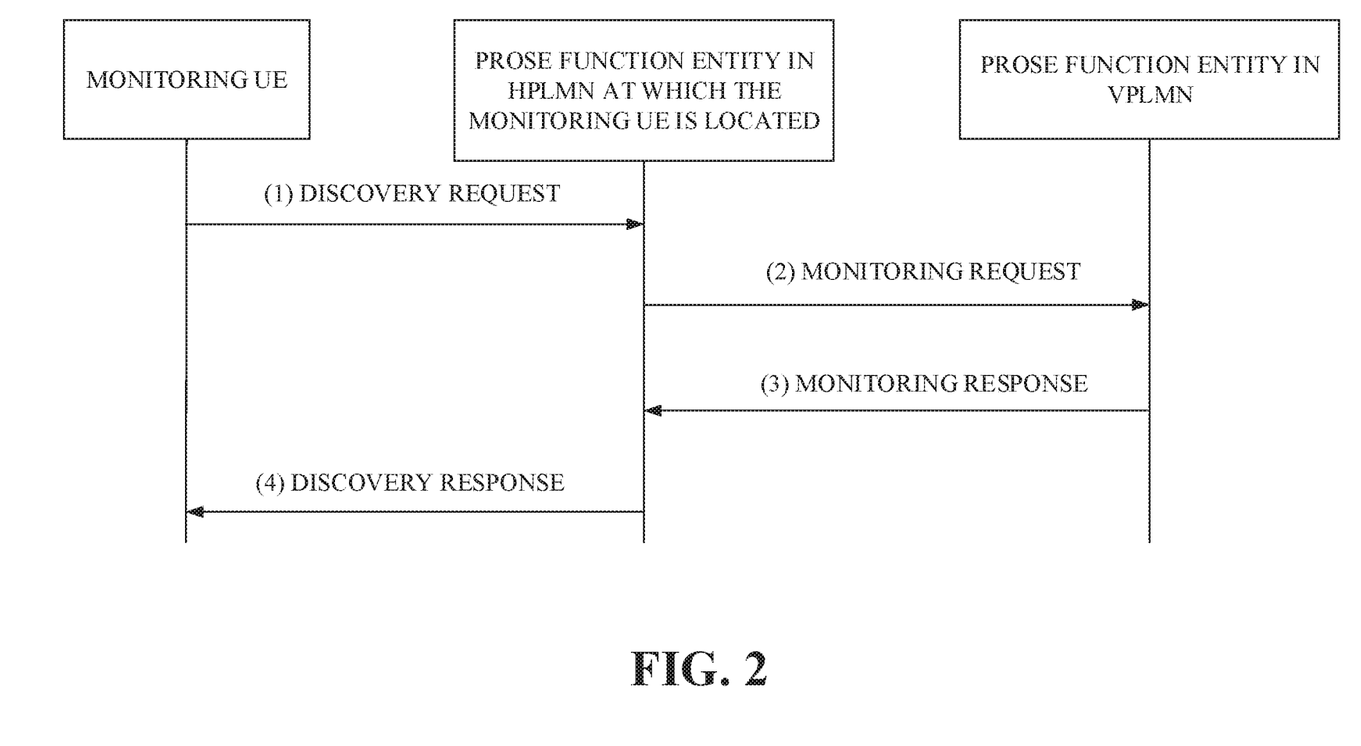
FIG. 2 is a registration process diagram of a monitoring UE.
Figure 3:
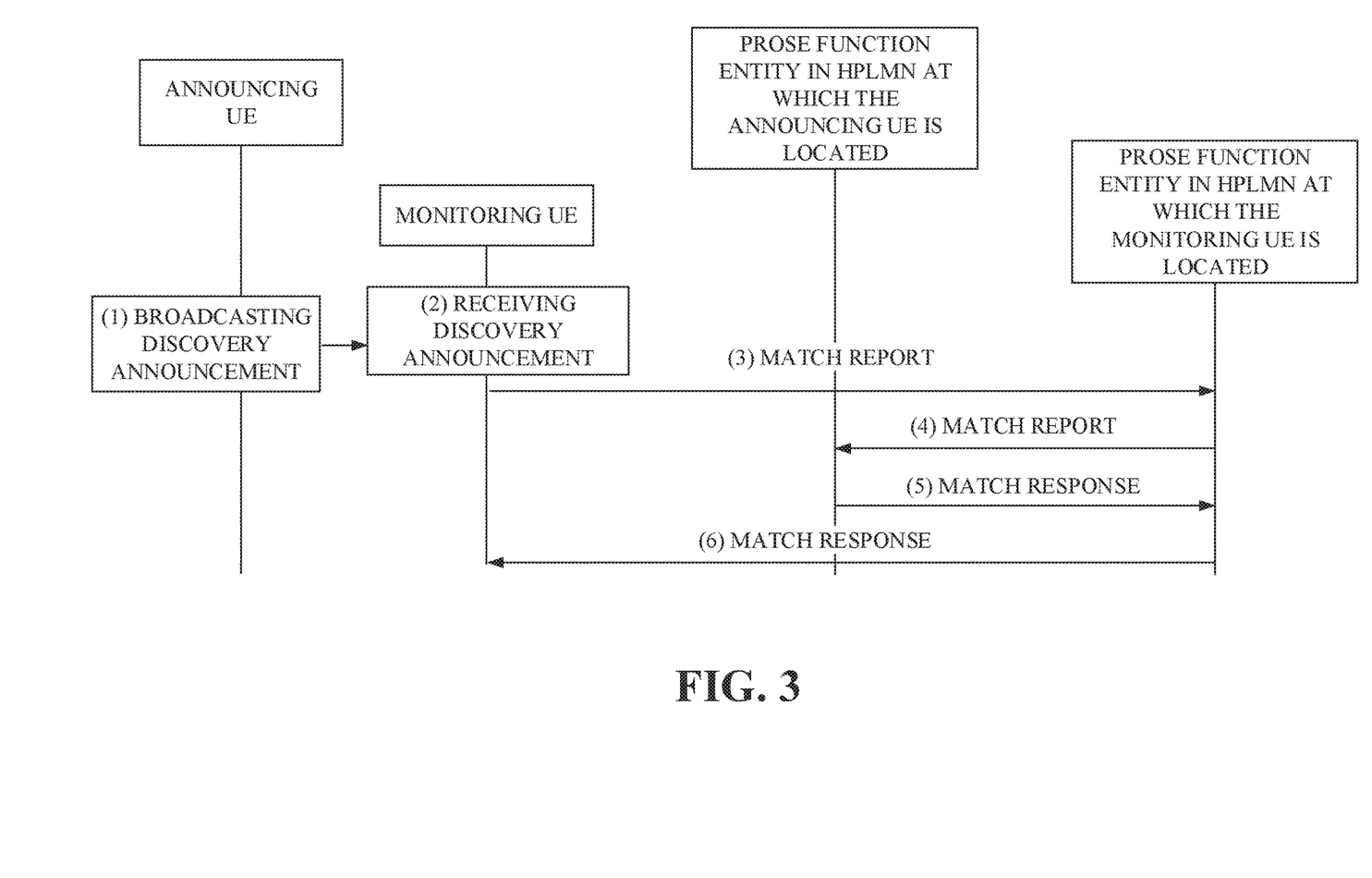
FIG. 3 is a process diagram of direct discovery.

In order to ensure the safety of the D2D discovery process, the discovery process recommended in the 3GPP TS 33.303 document includes three steps: registration of an announcing UE, registration of a monitoring UE, and a direct discovery process. These steps are as shown in FIGS. 1 to 3.

Figure 1:
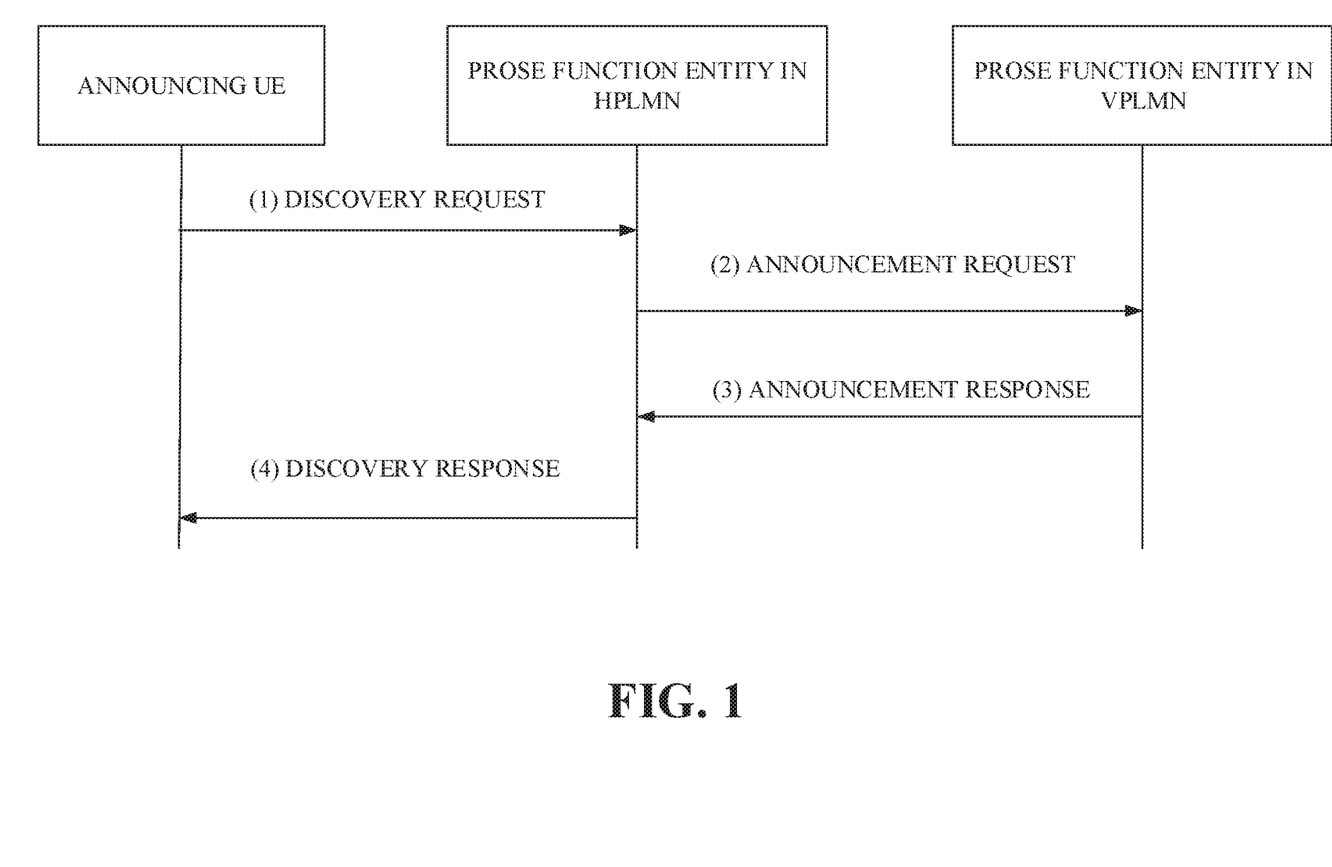
FIG. 1 is a registration process diagram of an announcing UE.

FIG. 1 shows a registration process of an announcing UE (3GPP TS 33.303). In the process as shown in FIG. 1, the specific implementation is as follows:

(1) An announcing UE transmits a discovery request containing an ID name of a ProSe application to a ProSe function entity in Home Public Land Mobile Network (HPLMN) at which the announcing UE is located;

(2) & (3) The ProSe function entity in the HPLMN informs the ProSe function entity in VPLMN (Visited Public Land Mobile Network, also referred to as "Visit PLMN") that the announcing UE will perform a discovery announcement in the VPLMN; the ProSe function entity in the VPLMN responds to the announcement.

(4) The ProSe function entity in the HPLMN replies a discovery response message containing a ProSe application code, a 128-bit key, a current time, a time window to the announcing UE. The key is for ensuring the security and authentication of the discovery message; the current time value is for the UE to set a clock of a D2D discovery message; the time window parameter indicates the maximum time of the D2D discovery process.

FIG. 2 shows a registration process of a monitoring UE (3GPP TS 33.303). In the process as shown in FIG. 2, the specific implementation is as follows:

(1) A monitoring UE transmits a discovery request containing the ID name of the ProSe application to the ProSe function entity in the HPLMN at which the monitoring UE is located, to apply for D2D discovery monitoring.

(2) & (3) The ProSe function entity in the HPLMN informs the ProSe function entity in the VPLMN that the monitoring UE will perform a monitoring announcement in the VPLMN.

(4) The ProSe function entity in the HPLMN replies a discovery response message containing the ProSe application code, the current time, the time window to the monitoring UE. The UE sets the clock of the ProSe at the current time value and saves the time window value.

FIG. 3 shows a direct discovery process (3GPP TS 33.303). In the process as shown in FIG. 3, the specific implementation is as follows:

(1) If the current time parameter is contained in the time window, the UE starts broadcasting the discovery announcement message containing the ID name of the ProSe application, the current time information, a 32-bit Message Integrity Check (abbreviated as MIC). The MIC, for example, is calculated according to the hash function after inputting the key, the current time parameter and the discovery announcement.

(2) If the ID name of the ProSe application contained in the broadcasted discovery announcement message is identical with the ProSe application monitored by the monitoring UE, after the monitoring UE receives the message, the current time information contained in the message is analyzed. If the time information is contained in the time window, the next step is performed.

(3) The monitoring UE transmits a match report containing the ID name of the ProSe application, the MIC code and the time to the ProSe function entity in the HPLMN at which the monitoring UE is located.

(4) The ProSe function entity in the HPLMN at which the monitoring UE is located transmits the match report to the ProSe function entity in the HPLMN at which the announcing UE is located, after receiving the match report.

(5) The ProSe function entity in the HPLMN at which the announcing UE is located finds a key corresponding to the ID name of the ProSe application name, calculates MIC code, determines by comparison whether the MIC code in the match report is correct. If so, a response message that the MIC is correct is replied to the ProSe function entity in the HPLMN at which the monitoring UE is located; if not, a response message that the MIC is wrong is replied.

(6) The ProSe function entity in the HPLMN at which the monitoring UE is located replies the response message to the monitoring UE. If the response message is that the MIC is correct, the monitoring UE considers the discovery is successful and furthermore a D2D connection with the announcing UE may be established; otherwise, if the response message is that the MIC is wrong, the monitoring UE considers the discovery is unsuccessful, and the context corresponding to the discovery should be discarded.

In the above solution, the MIC's role is quite critical, since the integrity, authentication, security such as anti-replay attacks, etc. of the discovery message is protected by means of the MIC code. In the calculation process for the MIC code, the key should be used, and is merely own by the ProSe function entity in the HPLMN at which the announcing UE is located and the ProSe function entity in the HPLMN at which the monitoring UE is located, and thus only the two ProSe function entities may correctly calculate the MIC.

In order to ensure the integrity, certification, non-replay of the received announcement message received, the monitoring UE should transmit the announcement message with the MIC to the ProSe function entity in the HPLMN at which the monitoring UE is located, and in turn, the ProSe function entity in the HPLMN at which the monitoring UE is located forwards to the ProSe function entity in the HPLMN at which the announcing UE is located.

In the above flowchart, since the monitoring UE could not verify whether the MIC is correct, the MIC should be forwarded to the ProSe function entity in the HPLMN at which the announcing UE is located, and the correctness of the MIC is verified by the announcing UE. Once the D2D application is widely in use, forwarding the MIC message by the monitoring UE will result in a great quantity of signaling requests. Meanwhile, there may appear to be a DoS attack mode in which a certain discovery announcement message with the MIC is continuously replayed by a malicious UE, and the nearby monitoring UEs will continuously forward the message and the MIC to the ProSe function entity in the HPLMN at which the announcing UE is located, thereby occupying a great quantity of system sources.

In order to solve the problems in D2D communications that only the announcing UE can verify the correctness of the MIC, a great quantity of system resources are occupied and there are vulnerabilities incurring DoS attacks, the present disclosure provides MIC verification in D2D communications and a D2D communications system. In conjunction with the accompanying drawings and the implementations, the present disclosure is further described in detail. It should be appreciated that the implementations described herein are merely for explaining the present disclosure, and is not intended to limit the present disclosure.

Figure 4:
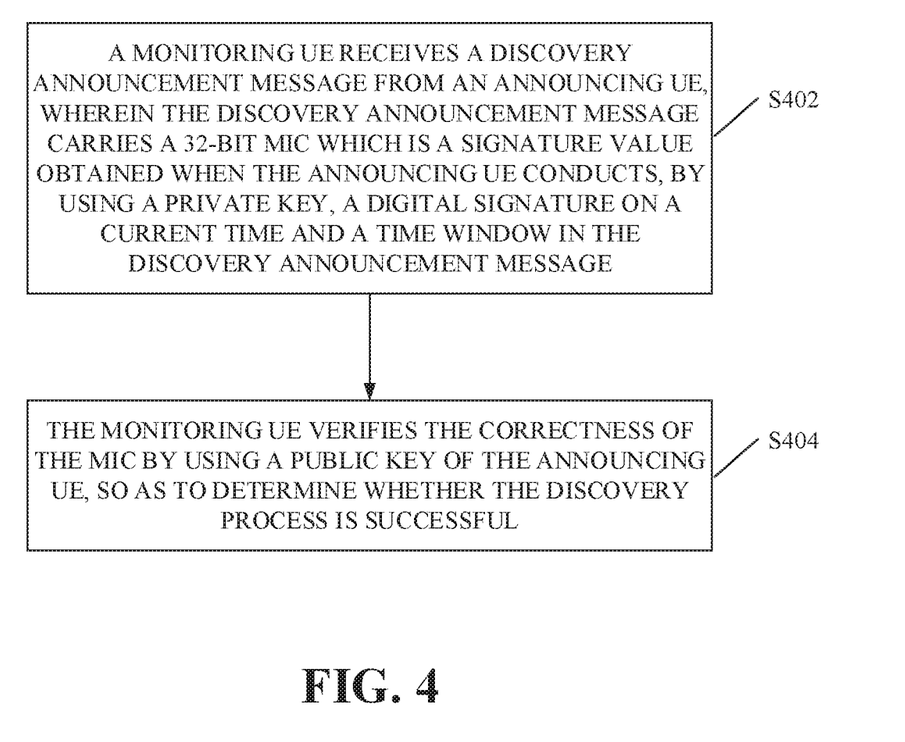
FIG. 4 is an MIC verification method in D2D communications according to an implementation of the present disclosure.

An implementation of the present disclosure provides an MIC verification method in D2D communications, the flowchart of which is as shown in FIG. 4 and includes Step S402 to Step S404.

Step S402: a monitoring UE receives a discovery announcement message from an announcing UE, wherein the discovery announcement message carries a 32-bit MIC which is a signature value obtained when the announcing UE conducts, by using a private key, a digital signature on a current time and a time window in the discovery announcement message;

Step S404: the monitoring UE verifies the correctness of the MIC by using a public key of the announcing UE, so as to determine whether the discovery process is successful.

In the implementation of the present disclosure, the public key and the private key of the announcing UE are used; the announcing UE calculates the MIC by means of the private key; the monitoring UE verifies the correctness of the MIC by means of the public key of the announcing UE, and shares functions of the announcing UE; resources are rationally used; and accordingly, the problems in D2D communications are solved that only the announcing UE can verify the correctness of the MIC, a great quantity of system resources are occupied and there are vulnerabilities incurring DoS attacks.

In the implementation process, before the monitoring UE receives the discovery announcement message from the announcing UE, the method comprises: generating, by the ProSe function entity in the HPLMN corresponding to the announcing UE, the public key and the private key of the announcing UE for signature, when the ProSe function entity in the HPLMN corresponding to the announcing UE receives a first discovery request message from the announcing UE; informing, by the ProSe function entity in the HPLMN corresponding to the announcing UE, the ProSe function entity in VPLMN that the announcing UE will perform a discovery announcement in the VPLMN, and transmitting the public key of the announcing UE to the ProSe function entity in the VPLMN, such that the ProSe function entity in the VPLMN saves the public key; and replying, by the ProSe function entity in the HPLMN corresponding to the announcing UE, a first discovery response message carrying the private key, the current time, and the time window to the announcing UE, such that the announcing UE calculates the MIC on the basis of the private key, the current time, and the time window.

In the above process, the registration process of the announcing UE is completed. At this time, the announcing UE has calculated the MIC by using the private key, and the ProSe function entity in the VPLMN also has saved the public key.

After the announcing UE completes the registration, or the ProSe function entity in the VPLMN saves the public key, the monitoring UE may perform the registration process comprising: informing, by the ProSe function entity in the HPLMN corresponding to the monitoring UE, the ProSe function entity in the VPLMN that the monitoring UE will monitor in the VPLMN, when the ProSe function entity in the HPLMN corresponding to the monitoring UE receives a second discovery request message from the monitoring UE; receiving, by the ProSe function entity in the HPLMN corresponding to the monitoring UE, the public key of the announcing UE transmitted by the ProSe function entity in the VPLMN; and replying, by the ProSe function entity in the HPLMN corresponding to the monitoring UE, a second discovery response message carrying the public key to the monitoring UE, such that the monitoring UE saves the public key. By now, the monitoring UE also completes the registration process.

An implementation of the present disclosure further provides a D2D communications system comprising: an announcing UE, a monitoring UE, a ProSe function entity in the HPLMN at which the announcing UE is located, a ProSe function entity in the HPLMN at which the monitoring UE is located, and a ProSe function entity in the VPLMN. The structure of these parts will be described respectively in conjunction with the accompanying drawings hereinafter.

Figure 5:
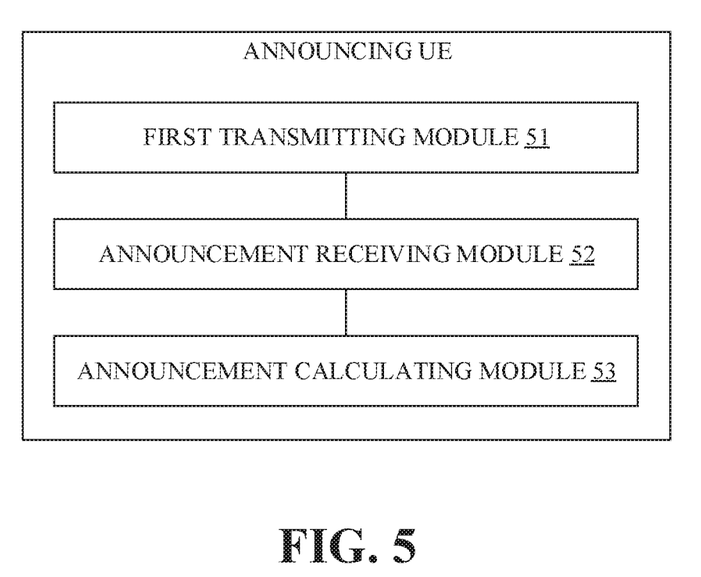
FIG. 5 is a schematic structural diagram of an announcing UE according to an implementation of the present disclosure.

The announcing UE according to the present implementation has a structure as schematically shown in FIG. 5, and comprises: a first transmitting module 51 for transmitting a first discovery request message to the ProSe function entity in the HPLMN corresponding to the announcing UE; an announcement receiving module 52 coupled with the first transmitting module 51, and used for receiving a first discovery response message replied by the ProSe function entity in the HPLMN corresponding to the announcing UE, wherein the first discovery response message carries a private key, a current time, and a time window; and an announcement calculating module 53 coupled with the announcement receiving module 52, and used for calculating an MIC on the basis of the private key, the current time, and the time window.

Figure 6:
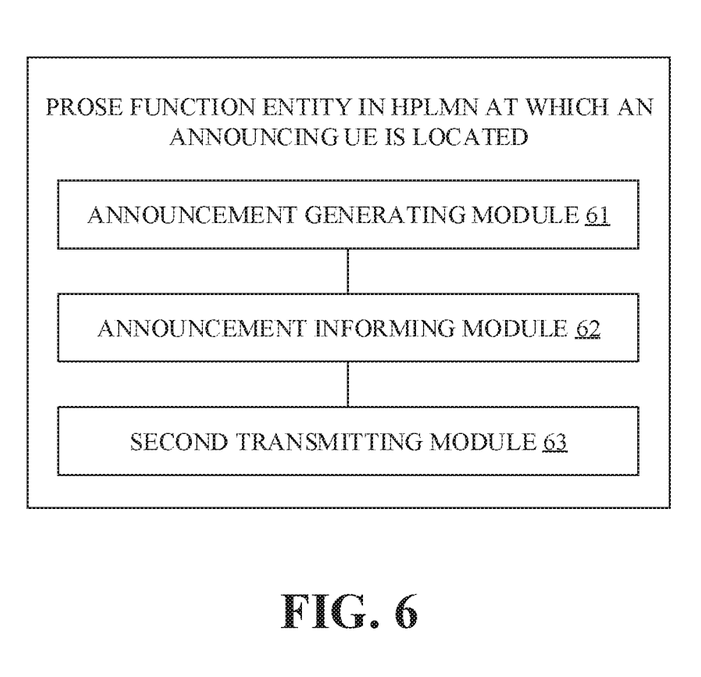
FIG. 6 is a schematic structural diagram of a ProSe function entity in HPLMN corresponding to an announcing UE according to an implementation of the present disclosure.

The ProSe function entity in the HPLMN according to the present implementation has a structure as schematically shown in FIG. 6, interacts with the announcing UE, and comprises: an announcement generating module 61 for generating a public key and the private key of the announcing UE for signature, when receiving a first discovery request message from the announcing UE; an announcement informing module 62 coupled with the announcement generating module 61, and used for informing the ProSe function entity in the VPLMN that the announcing UE will perform a discovery announcement in the VPLMN; and a second transmitting module 63 coupled with the announcement informing module 62, and used for transmitting the public key of the announcing UE to the ProSe function entity in the HPLMN, such that the ProSe function entity in the VPLMN saves the public key, and is further used for replying a first discovery response message carrying the private key, a current time, and a time window to the announcing UE, such that the announcing UE calculates the MIC on the basis of the private key, the current time, and the time window.

Figure 7:
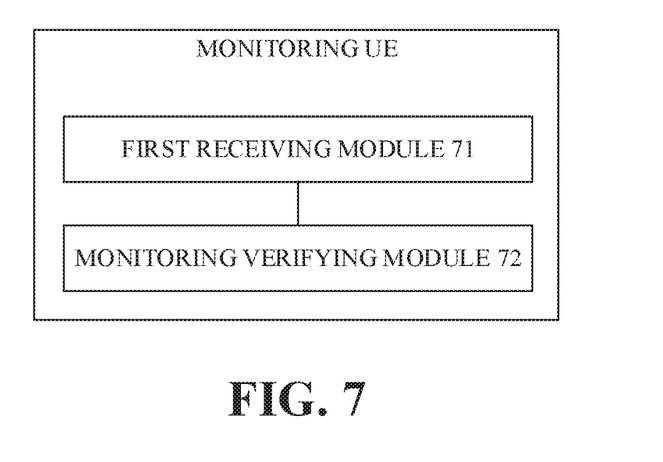
FIG. 7 is a schematic structural diagram of a monitoring UE according to an implementation of the present disclosure.

The monitoring UE according to the present implementation has a structure as schematically shown in FIG. 7, and comprises: a first receiving module 71 for receiving a discovery announcement message from the announcing UE, wherein the discovery announcement message carries a 32-bit MIC which is a signature value obtained when the announcing UE conducts, by using the private key, a digital signature on the current time and the time window in the discovery announcement message; and a monitoring verifying module 72 coupled with the first receiving module 71, and is used for verifying the correctness of the MIC by using the public key of the announcing UE, so as to determine whether the discovery process is successful.

Figure 8:
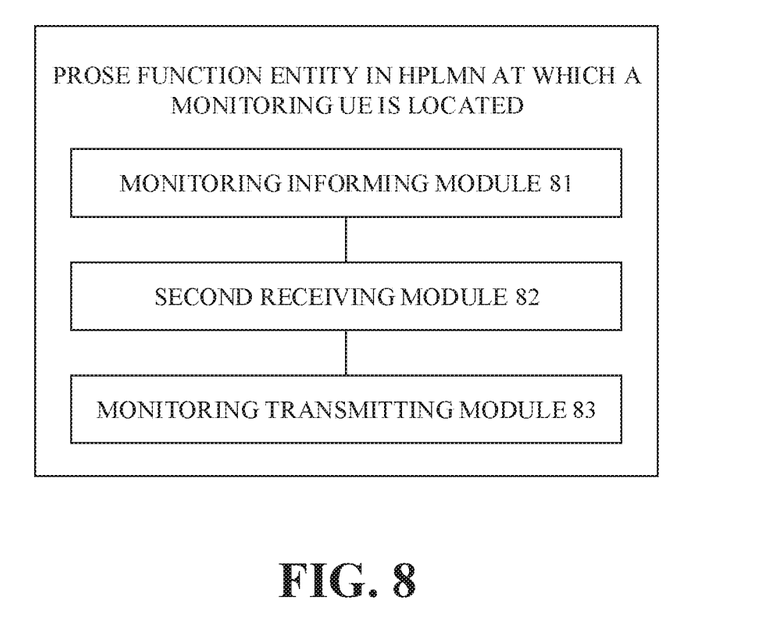
FIG. 8 is a schematic structural diagram of a ProSe function entity in HPLMN corresponding to a monitoring UE according to an implementation of the present disclosure.

The ProSe function entity in the HPLMN according to the present implementation has a structure as schematically shown in FIG. 8, interacts with the monitoring UE, and comprises: a monitoring informing module 81 for informing the ProSe function entity in the VPLMN that the monitoring UE will monitor in the VPLMN, when receiving a second discovery request message from the monitoring UE; a second receiving module 82 coupled with the monitoring informing module 81, and is used for receiving the public key of the announcing UE transmitted by the ProSe function entity in the VPLMN; and a monitoring transmitting module 83 coupled with the second receiving module 82, and is used for replying a second discovery response message carrying the public key to the monitoring UE, such that the monitoring UE saves the public key.

Figure 9:
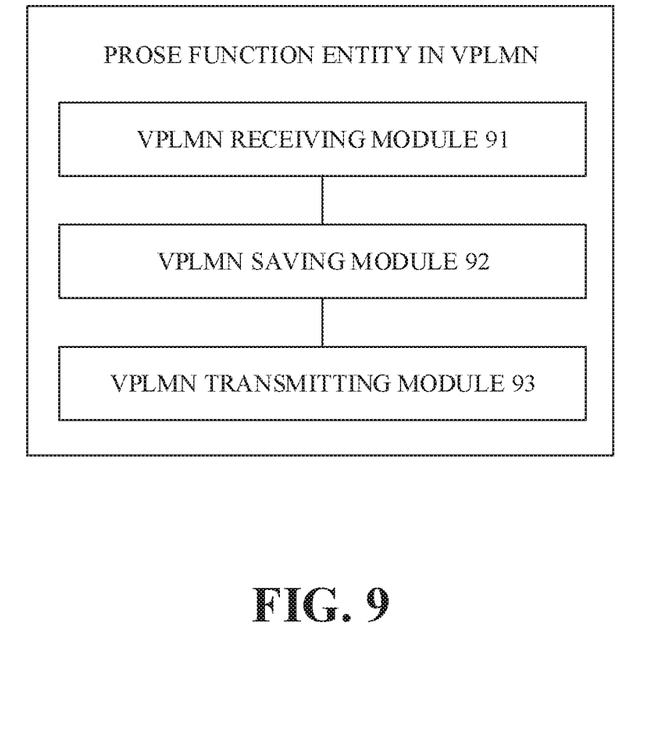
FIG. 9 is a schematic structural diagram of a ProSe function entity in VPLMN according to an implementation of the present disclosure.

The ProSe function entity in the VPLMN according to the present implementation has a structure as schematically shown in FIG. 9, interacts with the ProSe function entity in the HPLMN, and comprises: a VPLMN receiving module 91 for receiving the public key of the announcing UE transmitted by the ProSe function entity in the HPLMN corresponding to the announcing UE, before the announcing UE performs the discovery announcement in the VPLMN; a VPLMN saving module 92 coupled with the VPLMN receiving module 91, and is used for saving the public key of the announcing UE; and a VPLMN transmitting module 93 coupled with the VPLMN saving module 92, and is used for transmitting the public key of the announcing UE to the ProSe function entity in the HPLMN corresponding to the monitoring UE, before the monitoring UE monitors in the VPLMN.

Preferred Implementation

An implementation of the present disclosure proposes a D2D communications system and an MIC verification method in which a monitoring UE performs an MIC verification operation which may be performed by an announcing UE as before, so as to attempt to reduce signaling traffic in D2D discovery process, reduce communication burden of the system, and meanwhile reduce vulnerabilities incurring DoS attacks in the D2D discovery process.

The significant differences between the method proposed by the present implementation and the prior solution are: firstly, in this implementation, the monitoring UE performs the MIC verification operation; secondly, the calculation method for the MIC in this implementation is different. To speak more precisely, the MIC is a digital signature of the announcing UE. This is because, if the previous calculation method for the MIC is used as before, keys should be transmitted to the monitoring UE, and in this way, the monitoring UE may also freely transmit announcements, which is very dangerous.

This system involves five entities: an announcing UE, a monitoring UE, a ProSe function entity in HPLMN at which the announcing UE is located, a ProSe function entity in HPLMN at which the monitoring UE is located, and a ProSe function entity in VPLMN. The interaction process of these entities will be described in conjunction with the accompanying drawings hereinafter.

Figure 10:
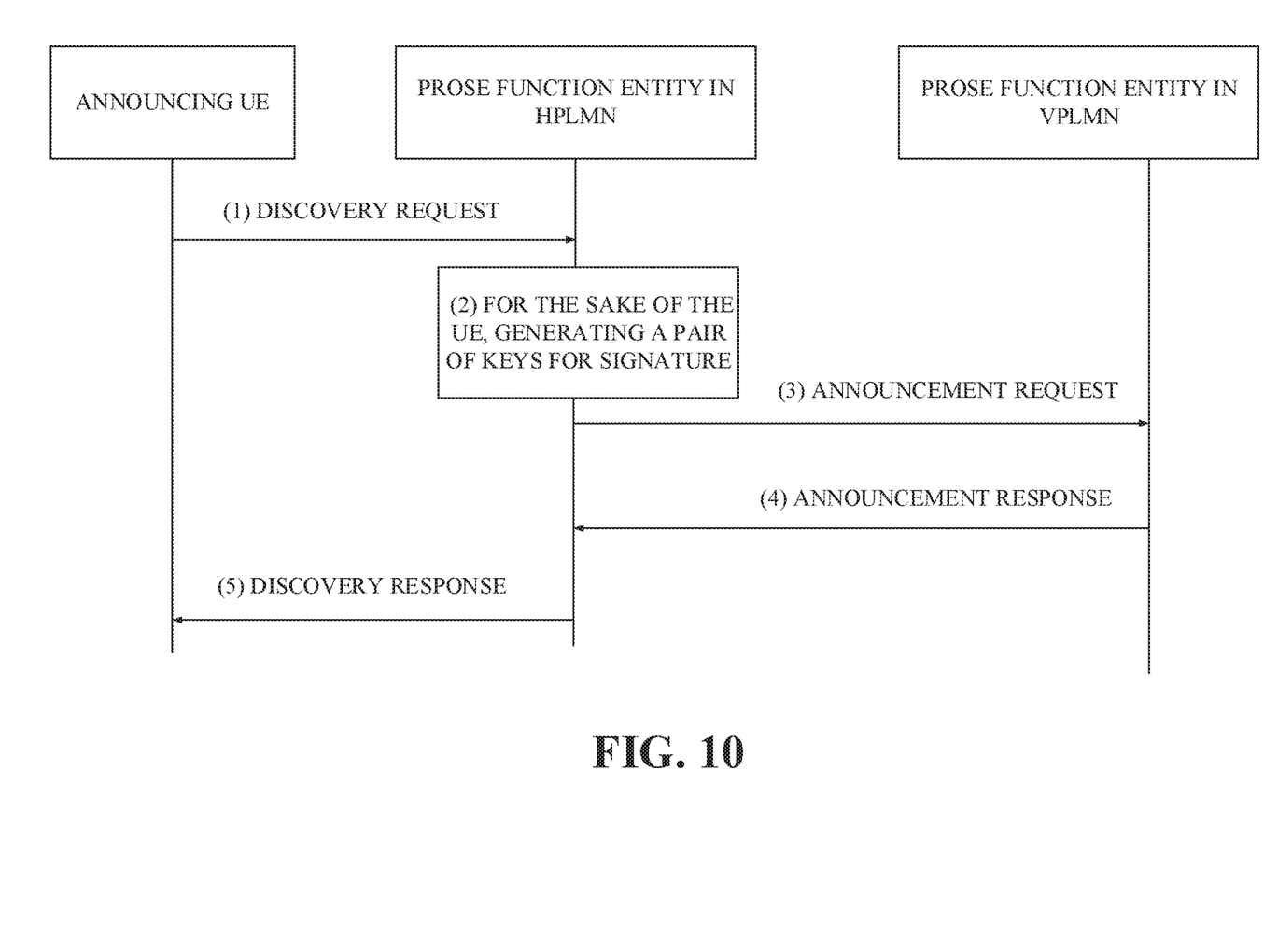
FIG. 10 is a registration flowchart of an announcing UE according to a preferred implementation of the present disclosure.

FIG. 10 shows a registration process of the announcing UE. The specific implementation is as follows:

(1) The announcing UE transmits a discovery request message containing an ID name of a ProSe application to the ProSe function entity in the HPLMN at which the announcing UE is located;

(2) The ProSe function entity in the HPLMN generates a public key and a private key of the announcing UE for signature, and the public key is paired with the private key;

(3) The ProSe function entity in the HPLMN informs the ProSe function entity in the VPLMN that the announcing UE will perform a discovery announcement in the VPLMN. Meanwhile, the ProSe function entity in the HPLMN transmits the public key of the announcing UE to the ProSe function entity in the VPLMN, and the ProSe function entity in the VPLMN saves the public key value.

(4) The ProSe function entity in the VPLMN replies an announcement response message;

(5) The ProSe function entity in the HPLMN replies a discovery response message containing a ProSe application code, a signature private key, a current time, a time window to the announcing UE. The current time value is for the UE to set a clock of a D2D discovery message; the time window parameter indicates the maximum time of the D2D discovery process.

Figure 11:
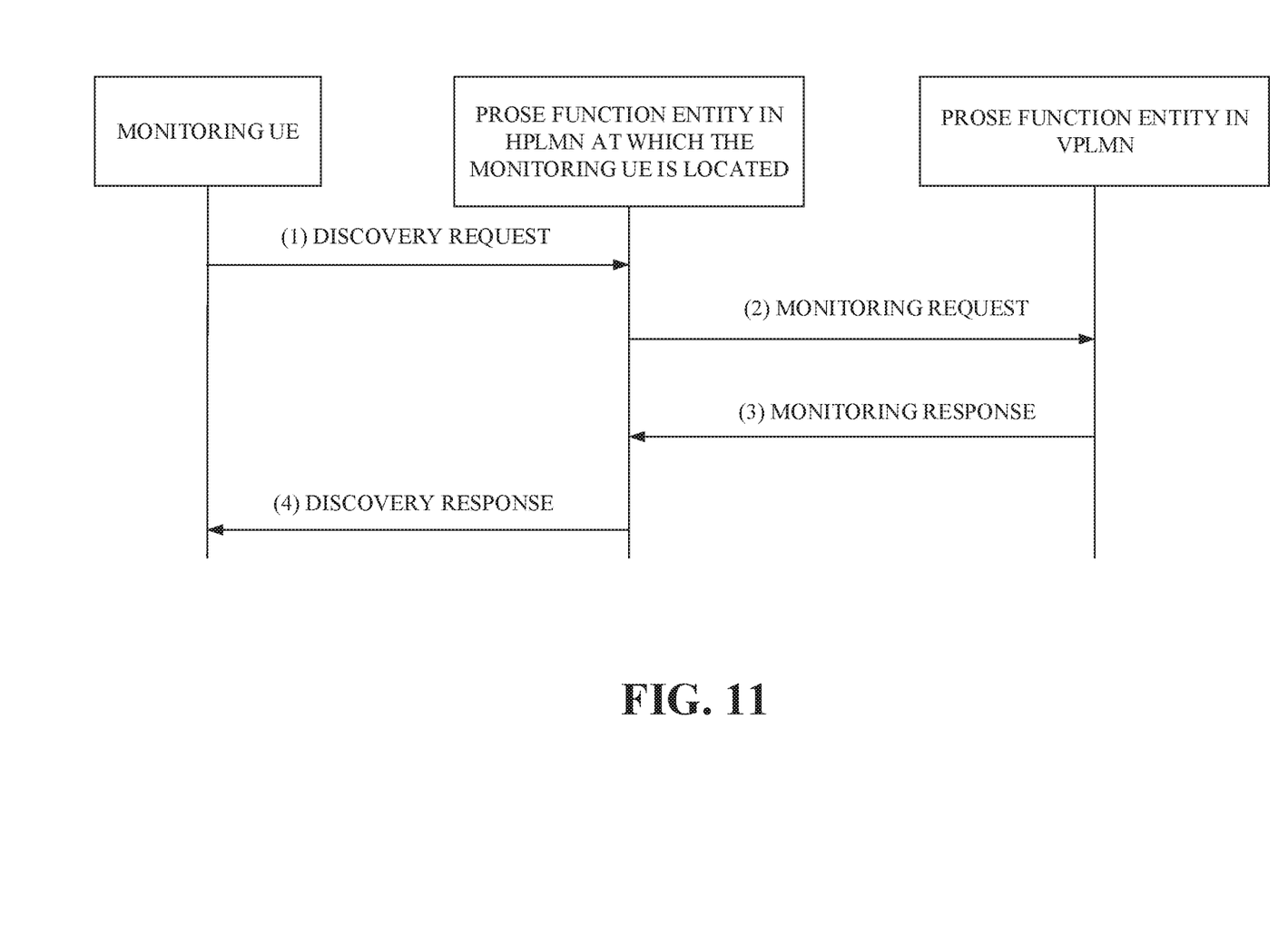
FIG. 11 is a registration flowchart of a monitoring UE according to a preferred implementation of the present disclosure.

FIG. 11 shows a registration process of the monitoring UE. The specific implementation is as follows:

(1) The monitoring UE transmits a discovery request containing the ID name of the ProSe application to the ProSe function entity in the HPLMN at which the monitoring UE is located, to apply for D2D discovery monitoring.

(2) The ProSe function entity in the HPLMN informs the ProSe function entity in the VPLMN that the monitoring UE will monitor in the VPLMN.

(3) The ProSe function entity in the VPLMN replies a monitoring response message.

(4) The ProSe function entity in the HPLMN replies a discovery response message containing the ProSe application code, the current time, the time window and the public key to the monitoring UE. The UE sets the clock of the ProSe at the current time value and saves the time window value and the public key value.

Figure 12:
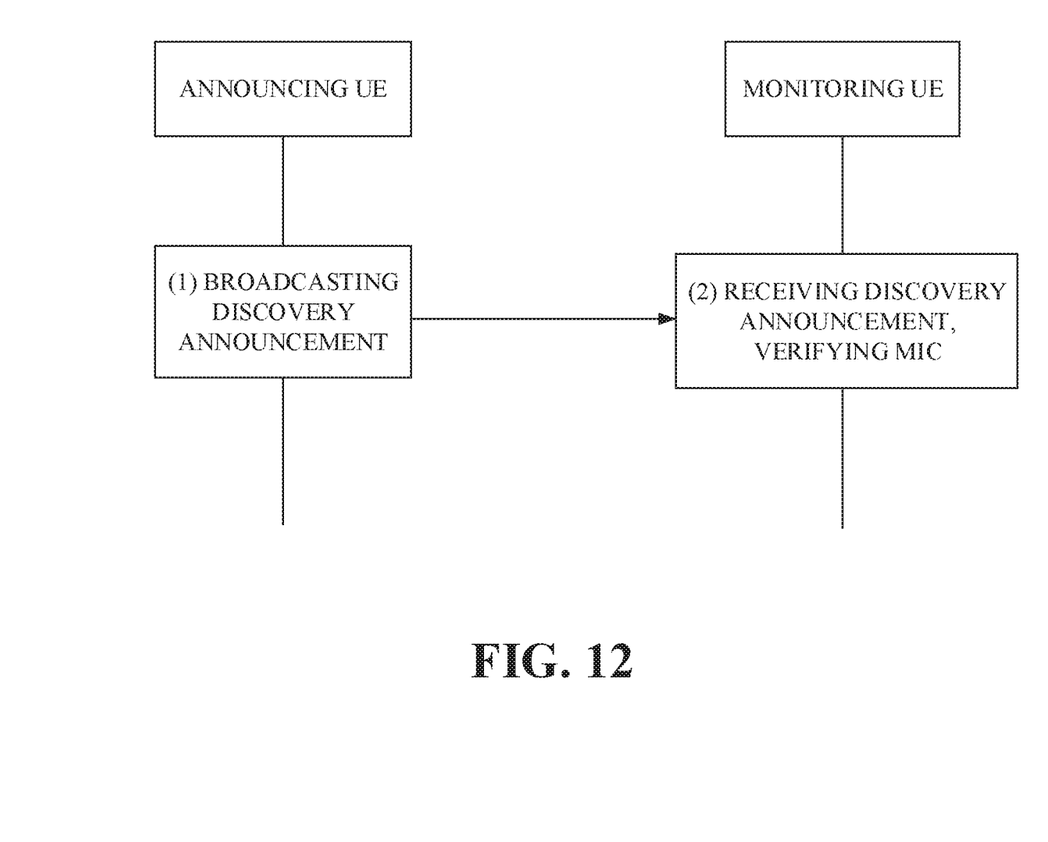
FIG. 12 is a schematic discovery process diagram of an announcing UE and a monitoring UE according to a preferred implementation of the present disclosure.

FIG. 12 shows a discovery process of the announcing UE and the monitoring UE. The specific implementation is as follows:

(1) If the current time parameter is contained in the time window, the UE starts broadcasting the discovery announcement message containing the ID name of the ProSe application, the current time information, a 32-bit MIC. The MIC is a signature value obtained when conducting, by using the private key, a digital signature on the discovery announcement and the current time parameter.

(2) After the monitoring UE receives the discovery announcement message, the public key is used to verify the MIC. If the MIC is verified as correct, that the discovery is successful is considered; otherwise, if the MIC is verified as wrong, that the discovery is unsuccessful is considered, and the context corresponding to the discovery should be discarded.

The present implementation proposes an improved solution of the D2D communications discovery process, in which the monitoring UE performs the MIC verification operation. By means of the implementation of the present disclosure, the signaling traffic in the D2D discovery process may be reduced, the communication burden of the system may be reduced, and meanwhile the vulnerabilities incurring DoS attacks in the D2D discovery process may be reduced.

Apparently, persons skilled in the art may make various modifications and variations to the present disclosure without departing the spirit and scope of the present disclosure. If these modifications and variations fall within the protection scope of the present disclosure as well as equivalents thereof, the present disclosure is also intended to include these modifications and variations.

What is claimed is:

1. A method for Message Integrity Check (MIC) generation in Device-to-Device (D2D) communications for an announcing User Equipment (UE), comprising:
    transmitting, by the announcing UE, a discovery request message to a Proximity Services (ProSe) function entity in a Home Public Land Mobile Network (HPLMN) corresponding to the announcing UE;
    in response to receiving the discovery request by the ProSe function entity in the HPLMN, performing, by the ProSe function entity in the HPLMN, steps comprising:
        generating a private key and a public key, wherein the private key and the public key are paired;
        sending, before a discovery announcement message is broadcasted by the announcing UE, the public key to a Visited Public Land Mobile Network (VPLMN) for the announcing UE; and
        sending, to the announcing UE, a discovery response message comprising the private key, a current time, and a time window;
    receiving, by the announcing UE, the discovery response message;
    calculating, by the announcing UE, a MIC using the private key to conduct a digital signature on the current time and the time window; and broadcasting, by the announcing UE, the discovery announcement message containing the MIC, wherein a monitoring UE verifies correctness of the MIC using the public key.

2. The method of claim 1, wherein the public key is saved by the ProSe function entity in the VPLMN for the announcing UE.

3. The method of claim 1, wherein the ProSe function entity in the VPLMN for the announcing UE transmits the public key to a HPLMN corresponding to the monitoring UE before the monitoring UE monitors in the VPLMN.

4. A method for Message Integrity Check (MIC) verification in Device-to-Device (D2D) communications for a monitoring User Equipment (UE), comprising:

receiving, by the monitoring UE, a discovery announcement message from an announcing UE, wherein the discovery announcement message carries a MIC, a current time, and a time window, wherein the MIC is generated by the announcing UE using a private key to conduct a digital signature on the current time and the time window, wherein the private key is paired with a public key, wherein the private key and the public key are generated by a ProSe function entity in a Home Public Land Mobile Network (HPLMN) corresponding to the announcing UE in response to receiving a first discovery request, and wherein the public key is sent to a Visited Public Land Mobile Network (VPLMN) for the announcing UE before the discovery announcement message is broadcasted by the announcing UE; and verifying, by the monitoring UE, correctness of the MIC by using the public key to determine whether a discovery process is successful.

5. A system for Device-to-Device (D2D) communications, the system comprising an announcing User Equipment (UE), a monitoring UE, and a Proximity Services (ProSe) function entity in a Home Public Land Mobile Network (HPLMN) corresponding to the announcing UE, wherein the announcing UE comprises:
a first transmitting circuit configured to transmit a first discovery request message to the ProSe function entity in the HPLMN corresponding to the announcing UE;
an announcement receiving circuit configured to receive a first discovery response message transmitted by the ProSe function entity in the HPLMN corresponding to the announcing UE, wherein the ProSe function entity in the HPLMN corresponding to the announcing UE generates a public key paired with a private key, wherein the first discovery response message carries the private key, a current time, and a time window, and wherein the public key is transmitted to a ProSe function entity in a Visited Public Land Mobile Network (VPLMN) for the announcing UE; and
an announcement calculating circuit configured to generate a MIC using the private key to conduct a digital signature on the current time and the time window;

the monitoring UE comprises:
a first receiving circuit configured to receive a discovery announcement message from the announcing UE, wherein the discovery announcement message carries the MIC, the current time, and the time window; and a monitoring verifying circuit configured to verify correctness of the MIC by using the public key to determine whether a discovery process is successful, wherein the public key is received from the ProSe function entity in the VPLMN for the announcing UE; and the ProSe function entity in the HPLMN corresponding to the announcing UE comprises:
an announcement generating circuit configured to generate the public key and the private key in response to receiving the first discovery request message; and
a second transmitting circuit configured to reply a first discovery response to the first discovery request message, wherein the first discovery response comprises the private key.

6. The system of claim 5, wherein the ProSe function entity in the HPLMN corresponding to the announcing UE further comprises:
an announcement informing circuit configured to inform the ProSe function entity in the VPLMN for the announcing UE that the announcing UE will perform the discovery announcement message in the VPLMN, wherein
the second transmitting circuit is further configured to transmit the public key to the ProSe function entity in the VPLMN.

7. The system of claim 6, further comprising the ProSe function entity in the HPLMN corresponding to the monitoring UE, wherein the ProSe function entity in the HPLMN corresponding to the monitoring UE comprises:
a monitoring informing circuit configured to inform the ProSe function entity in the VPLMN for the announcing UE that the monitoring UE will monitor in the VPLMN in response to receiving a second discovery request message from the monitoring UE;
a second receiving circuit configured to receive the public key transmitted by the ProSe function entity in the VPLMN; and
a monitoring transmitting circuit configured to transmit a second discovery response message to the monitoring UE containing the public key.

8. The system of claim 7, wherein the ProSe function entity in the VPLMN for the announcing UE comprises:
a VPLMN receiving circuit configured to receive the public key that was transmitted by the ProSe function entity in the HPLMN corresponding to the announcing UE;
a VPLMN saving circuit configured to save the public key; and
a VPLMN transmitting circuit configured to transmit the public key to the ProSe function entity in the HPLMN corresponding to the monitoring UE.

9. The system of claim 8, wherein the public key is received by the VPLMN receiving circuit of the ProSe function entity in the VPLMN for the announcing UE before the announcing UE performs the discovery announcement message in the VPLMN.

10. The system of claim 8, wherein the VPLMN transmitting circuit transmits the public key to the ProSe function entity in the HPLMN corresponding to the monitoring UE before the monitoring UE monitors in the VPLMN for the announcing UE.

* * * * *